Oct. 3, 1950 W. J. FIELD Re. 23,275

MOTOR CONTROLLING APPARATUS

Original Filed Nov. 6, 1944 2 Sheets-Sheet 1

INVENTOR
WILLIAM J. FIELD

BY George H. Fisher
ATTORNEY

MOTOR CONTROLLING APPARATUS

Original Filed Nov. 6, 1944 2 Sheets-Sheet 2

INVENTOR
WILLIAM J. FIELD

BY George H. Fisher
ATTORNEY

Reissued Oct. 3, 1950 Re. 23,275

UNITED STATES PATENT OFFICE 23,275

MOTOR CONTROLLING APPARATUS

William J. Field, Minneapolis, Minn., assignor to Minneapolis-Honeywell Regulator Company, Minneapolis, Minn., a corporation of Delaware Original No. 2,480,125, dated August 30, 1949, Serial No. 562,087, November 6, 1944. Application for reissue June 3, 1950, Serial No. 166,040

12 Claims. (Cl. 318—202)

Matter enclosed in heavy brackets [ ] appears in the original patent but forms no part of this reissue specification; matter printed in italics indicates the additions made by reissue The present invention is concerned with motor controlling apparatus and more particularly with apparatus in which a motor is operated in accordance with the amplitude of an alternating signal voltage.

It has been proposed to operate an alternating current motor in accordance with the magnitude and phase of an alternating signal voltage through the use of a discriminator circuit which is energized in one manner or the other, depending upon the phase of the alternating current. In such prior art motor controlling apparatus, it has been customary to energize the motor with the half wave rectifier output of the discriminator stage and to employ means for causing this half wave output to simulate as nearly as possible the wave shape of an alternating voltage.

An object of the present invention is to provide a motor controlling apparatus in which a motor is energized with an alternating voltage varying in phase in accordance with the phase of an alternating signal voltage.

A further object of the present invention is to provide such an arrangement in which the electronic discharge devices of the discriminator stage are conductive during both half cycles of a complete cycle of the alternating voltage.

A still further object of the present invention is to provide such an arrangement in which the motor may be reversibly operated in accordance with the phase of the signal voltage.

A still further object of the invention is to provide an arrangement of the type such as set forth in the previous objects in which the electronic discharge devices employed are of the gas filled type.

Another object of the invention is to provide an improved type of discriminator circuit in which the electronic discharge devices of the discriminator circuit are conductive during both half cycles so that the output of the discriminator circuit is an alternating voltage.

Figure 1:
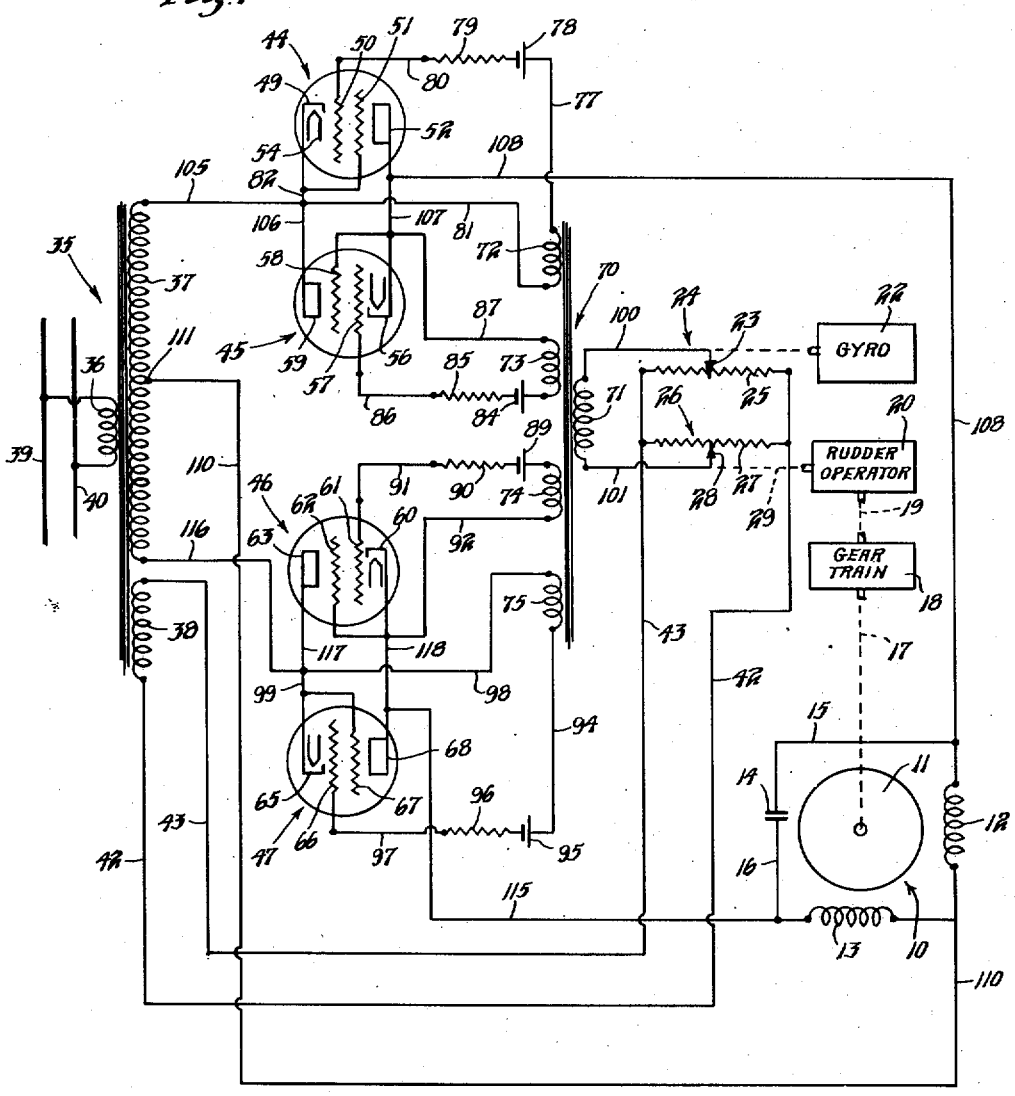
Figure 2:
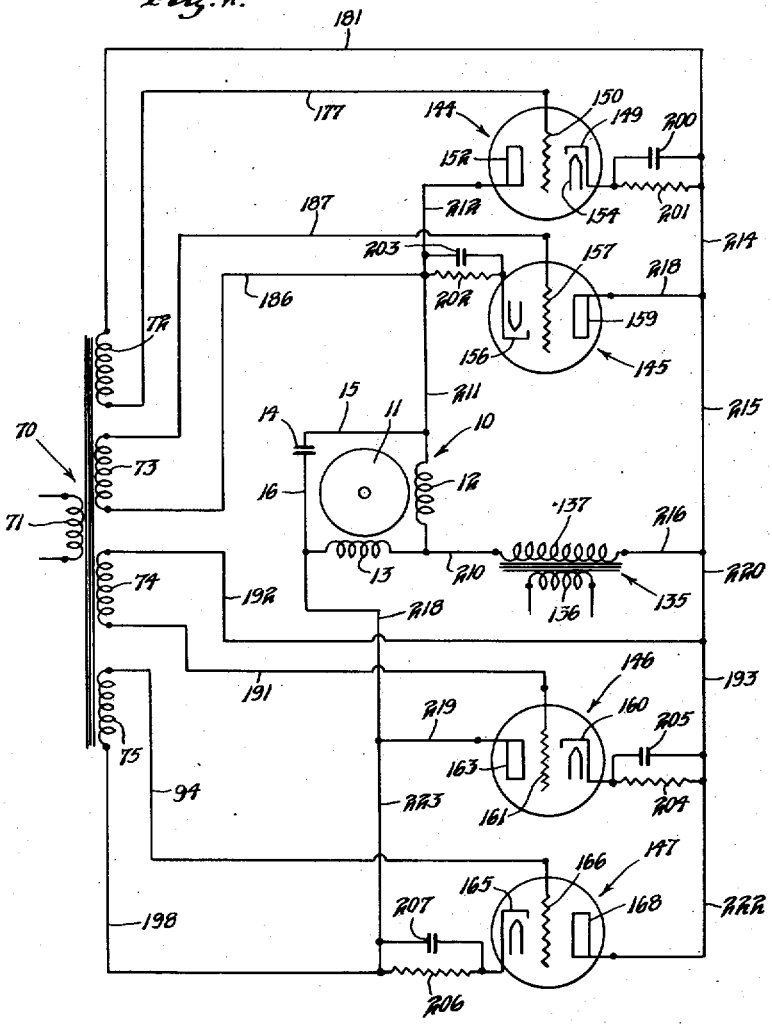

Other objects of the invention will be apparent from a consideration of the accompanying specification, claims and drawing, of which Figure 1 is a schematic showing of one form of my improved motor controlling apparatus shown as applied to the positioning of the rudder of an aircraft, and Figure 2 is a schematic showing of a modified form of my apparatus.

Referring to the drawing for a more detailed understanding of the invention, the motor to be controlled is indicated generally by the reference numeral 10. This motor comprises a squirrel cage rotor 11 with which are associated a pair of field windings 12 and 13. A condenser 14 is connected through conductors 15 and 16 to the field windings 12 and 13. The function of condenser 14, as will be explained more fully later, is to cause the current through one or the other of the two field windings 12 and 13 to lead that through the other. The squirrel cage rotor 11 is connected through a shaft schematically shown in the drawing and indicated by the reference numeral 17 to a gear train 18. The gear train, in turn, is connected through a shaft 19 to a rudder operator 20.

The motor as illustrated in the application is employed for positioning the rudder operator 20 in accordance with the signal received from a gyroscope 22.

The gyroscope 22 is adapted to position a movable contact 23 of a control potentiometer 24. The control potentiometer 24 in addition to the movable contact 23 comprises a resistance element 25 over which contact 23 is movable. The potentiometer 24 is associated with a further potentiometer 26 comprising a resistor 27 and a contact 28 slidable thereover. The two resistance elements 25 and 27 are connected together to form a Wheatstone bridge. The contact 28 is operatively connected through a shaft 29 to the rudder operator 20 and is thus positioned by shaft 19. The potentiometer 26 functions as a rebalancing potentiometer.

Power is supplied to the system through a transformer 35. This transformer comprises a primary winding 36 and secondary windings 37 and 38. The primary winding 36 is connected to line wires 39 and 40 leading to a suitable source of power (not shown). The secondary winding 38 is employed for supplying power to the Wheatstone bridge and is connected by conductors 42 and 43 to the opposite terminals of resistor 27 of control potentiometer 26. These two terminals constitute the input terminals of the Wheatstone bridge and contacts 23 and 28 the output terminals.

The output of the bridge is employed to control the operation of motor 10 through four gas filled discharge devices 44, 45, 46, and 47. These discharge devices are all similar in construction. The discharge device 44 comprises an electrically heated cathode 49, a control grid 50, a shield grid 51 and an anode 52. Associated with the cathode 49 is a cathode heater 54 which is connected to any suitable source of power (not shown) such as an additional secondary of transformer 35. Similarly, the tube 45 comprises a cathode 56, a control grid 57, a shield grid 58 and an anode 59. Tube 46 comprises a cathode 60, a control grid 61, a shield grid 62 and an anode 63. Tube 47 includes a cathode 65, a control grid 66, a shield grid 67 and an anode 68. In each case, the cathodes have associated with them a cathode heater element. The elements of each discharge device are enclosed within a gas filled envelope.

The voltage applied to the control grids of the various tubes is obtained from the control bridge through a transformer 70. This transformer comprises a primary winding 71 and four secondary windings 72, 73, 74, and 75. The upper terminal of secondary 72 is connected to control grid 60 through a conductor 77, a biasing battery 78, a protective resistor 79 and a conductor 80. The other terminal of secondary 72 is connected through conductors 81 and 82 to the cathode 49. Similarly, the lower terminal of secondary 73 is connected through a biasing battery 84, a protective resistor 85 and a conductor 86 to the control grid 57. The upper terminal of secondary 73 is connected through a conductor 87 to the cathode 56 of the same tube 45.

The upper terminal of secondary 74 is connected through a biasing battery 89, a protective resistor 90, and a conductor 91 to the control grid 61 of tube 46. The lower terminal of secondary 74 is connected through conductor 92 to the cathode 60. The lower terminal of secondary 75 is connected through conductor 94, biasing battery 95, protective resistor 96 and conductor 97 to the control grid 66. The upper terminal of the secondary 75 is connected through conductors 98 and 99 to cathode 65. Thus, each of the secondaries 72, 73, 74, and 75 is connected between the grid and cathode of one of the tubes in series with a biasing battery. In each case the polarity of the biasing battery is such as to tend to render the grid negative with respect to the cathode and is of sufficient magnitude that in the absence of any other voltage the grid is maintained at a potential below the value at which the tubes are conductive.

The primary 71 of transformer 70 is connected to contacts 23 and 28 of the bridge by means of conductors 100 and 101. It will be recalled that contacts 23 and 28 constitute the output terminals of the bridge.

Operation of Figure 1

The various elements are shown in the position they assume when the aircraft is in the desired attitude. Under these conditions, no one of the tubes 44 to 47 is conductive since in each case, the grid is biased negatively sufficiently to render the tube in question non-conductive. Consequently, no current is supplied to the motor field windings 12 and 13 and the motor is inoperative. Now let it be assumed that the aircraft departs from the desired course so that the gyroscope 22 is effective to move the contact 23 to the right. The effect of this will be to cause contact 23 to be at a voltage different from that of contact 28 so that an unbalance voltage exists across the terminals of the bridge. This unbalance voltage will in turn be applied to primary winding 71 of transformer 70. This in turn will cause a voltage to appear across the terminals of each of the secondaries 72 to 75. The secondary windings 72 to 75 are so wound that during the half cycle in which the upper terminal of secondary 37 is positive with respect to the lower terminal, the upper terminals of secondaries 72 and 73 will be negative with respect to the lower terminals, while the upper terminals of secondaries 74 and 75 will be positive with respect to the lower terminals.

Considering the conditions during the half cycle in which the polarities mentioned in the last paragraph exist, the anode 68 of tube 47 is positive with respect to the cathode. However, the grid 66 during this half cycle is connected to what is the negative end of secondary 75. Consequently, both the voltage of secondary 75 and that of biasing battery 95 are tending to drive grid 66 negative with respect to the cathode so that the tube 47 is effectively non-conductive. In the case of tube 46, the anode 63 is negative with respect to the cathode 60 so that this tube is likewise non-conductive. In the case of tube 44, the anode is negative with respect to the cathode so that the tube is non-conductive.

Let us now consider the polarities in connection with tube 45. It is to be noted that the anode 45 is connected to the end of the transformer secondary 37 which is positive during this half cycle with respect to center tap 111. Moreover, the control grid 57 is connected to the lower end of secondary 73 which during this half cycle is positive with respect to the cathode. The positive voltage impressed upon grid 57 by secondary 73 thus tends to overcome the effect of biasing battery 84 so as to render tube 45 conductive. As a result, a circuit is established to motor field winding 12 as follows: from the upper terminal of secondary 37 through conductors 105 and 106, anode 59, cathode 56, conductors 107 and 108, field winding 12 and conductor 110 to the center tap 111 of secondary 37. At the same time, current flows to field winding 13 as follows: from the upper terminal of secondary 37, through conductors 105 and 106, anode 59, cathode 56, conductors 107, 108 and 15, condenser 14, conductor 16, field winding 13 and conductor 110 to the center tap of secondary 37.

Now let the conditions in the next half cycle be considered. Since the Wheatstone bridge is connected to the same source of power as the tubes 44 to 47, it will be obvious that the polarities will be reversed throughout. Thus, in the case of tube 47, the anode 68 will be negative with respect to the cathode 65 so that this tube will be non-conductive. While the anode 63 will now be positive with respect to cathode 60, the control grid 61 will also have its polarity reversed so as to be negative with respect to cathode 60. Hence, tube 46 will be non-conductive. In the case of tube 45, the anode 59 will now be negative with respect to the cathode so that this tube will be non-conductive. As for tube 44, the anode 52 will be positive with respect to the cathode 49 and the grid 50 will now be positive with respect to cathode 49. Hence, tube 44 will be conductive during this half cycle with the result that current will flow through winding 12 as follows: from the center tap 111 of secondary 37 through conductor 110, motor field winding 12, conductor 108, anode 52, cathode 49, and conductors 82 and 105 to the upper terminal of secondary 37. At the same time, a circuit will be established to field winding 13 as follows: from the center tap 111 of secondary 37 through conductor 110, field winding 13, conductor 16, condenser 14, conductors 15 and 108, anode 52, cathode 49 and conductors 82 and 105 back to the upper terminal of secondary 37.

It is to be noted from the above that tube 45 is conductive during one half cycle and tube 44 during the other half cycle. This is due to the fact that with the bridge unbalanced in the direction which is being assumed, the alternating voltages applied to grids 50 and 57 are in phase with the anode voltages of the tubes 44 and 45. It is further to be noted that the current during one half cycle flows in one direction through windings 12 and 13 and during the other half cycle in the opposite direction. Thus, there is a flow of alternating current through windings 12 and 13. The alternating current flow through winding 13 is through condenser 14 so that the current through this winding leads that through winding 12. Thus, the motor rotates in a predetermined direction to cause operation of the rudder in a predetermined direction. The operation of this rudder is in such a direction as to tend to restore the plane to the course which the gyroscope 22 is trying to maintain. Furthermore, the operation of the motor in this direction moves contact 28 to the right with respect to resistor 27. The movement of the motor will continue until the position of contact 28 again corresponds to that of contact 23, at which time the bridge will again be rebalanced so as to eliminate the unbalance voltage. This will in turn cause the disappearance of an alternating voltage across the terminals of the secondaries 72 to 75 with the result that tubes 44 to 47 all become non-conductive.

Thus, there will be a movement of the rudder in a direction such as to correct for the deviation of the craft from the desired course in an amount corresponding to the extent of such deviation.

The deflection of the rudder as a result of the foregoing action will cause the craft to gradually return to the desired course with the result that slider 23 is moved back to its original position. This causes slider 23 to be in a position to the left of slider 28 so as to result in an unbalance voltage appearing across the terminals of primary winding 71. This unbalance voltage furthermore will be 180° out of phase with respect to the unbalance voltage previously considered. Thus during the half cycle in which the upper terminal of secondary 37 is positive with respect to the lower terminal, the polarities of the voltages appearing across secondary windings 72 to 75 will be opposite to that indicated by the legends on the drawings.

Assuming the conditions just described, the relative polarities of the various elements of the tubes 44 to 47 will now be considered. In the case of tube 44, the cathode 49 will be positive with respect to the anode so that this tube will not be conductive. In the case of tube 45, while the anode is positive with respect to the cathode, the effect of the voltage across secondary 73 will be to cause grid 57 to be more negative with respect to cathode 56 so that this tube will not be conductive. In the case of tube 46, the anode 63 will be negative with respect to the cathode so that this tube will likewise not be conductive. In the case of tube 47, the anode 68 will be positive with respect to the cathode and the effect of the voltage across secondary 74 is to tend to cause grid 66 to be positive with respect to cathode 65. The effect of the voltage across secondary 75 will overcome the biasing effect of the battery 95 so that tube 47 will be conductive and current will flow through winding 13 as follows: from the center tap 111 through conductor 110, field winding 13, conductor 115, anode 68, cathode 65 and conductors 99 and 116 to the lower terminal of secondary 37. At the same time, a circuit will be established through field winding 12 as follows: from the center tap 111 through conductor 110, field winding 12, conductor 15, condenser 14, conductors 16 and 115, anode 68, cathode 65, and conductors 99 and 116 to the lower terminal of secondary 37.

Now let the conditions during the next half cycle be considered. Under these conditions, the lower terminal of secondary 37 will be positvie with respect to the upper terminal and the polarities of the voltages across secondaries 72 to 75 will be the same as those indicated by the legends. Under these conditions, tube 44 will be non-conductive because the grid 50 will be negative with respect to the cathode. Tube 45 will be non-conductive because of the fact that the anode 59 will be negative with respect to the cathode 56. Tube 47 will be non-conductive because of anode 68 being negative with respect to cathode 65. Tube 46, however, will be conductive since during this half cycle the anode 63 is positive with respect to the cathode and the voltage of grid 61 will likewise be positive with respect to the cathode 60. As a result, a circuit will be established to field winding 13 as follows: from the lower terminal of the secondary 37 through conductors 116 and 117, anode 63, cathode 60, conductors 118 and 115, motor field winding 13 and conductor 110 to the center tap 111. A circuit will also be established to field winding 12 as follows: from the lower terminal of secondary 37 through conductors 116 and 117, anode 63, cathode 60, conductors 118, 115, and 16, condenser 14, conductor 15, field winding 12 and conductor 110 to the center tap 111 of secondary 37.

It will be observed from the above description that with the bridge unbalanced in the direction described, tubes 46 and 47 are conductive during alternate half cycles. With these tubes conductive, moreover, current flows directly through field winding 13 while flowing through field winding 12 through condenser 14. As a result an alternating current flows in both windings 12 and 13, the current through winding 12 leading that through winding 13. It will be recalled that during the previous condition of unbalance the current through winding 13 leads that through winding 12. Thus the motor 10 will rotate in the direction opposite to that previously considered to move the rudder back to its normal position. The slider 28 will likewise be moved back to the left, and this movement of the rudder will be continued until the positions of sliders 23 and 28 again correspond, at which time the rudder will be in substantially its original or neutral position. The ship will now be back on the desired course and the rudder in its normal position. The movement of contact 28 back to a position corresponding to that of contact 23 will eliminate the unbalance voltage appearing across the bridge, and hence eliminate any alternating voltage across the secondaries 72 to 75. Tubes 44 to 47 will hence again become non-conductive.

It is to be noted from the above description that with the apparatus of the present invention, I have provided a discriminator arrangement in which alternating current is conducted to the motor field windings instead of half-wave rectified current. This results in much more desirable operation of the motor since the effect of the direct current component of a half-wave rectified current is detrimental to the proper operation of the motor.

Species of Figure 2

The arrangement of Figure 2 differs primarily from that of Figure 1 in the fact that it is possible to employ a single secondary winding of half the size of secondary winding 37 and without a center tap. This is accomplished by using the secondary winding to supply voltage to the anodes and cathodes of all four tubes. Another difference between the circuit of Figure 2 and that of Figure 1 is that vacuum tubes are employed instead of the gas filled tubes of Figure 1. By reason of the use of vacuum tubes with their less critical sensitivity, it is possible to employ a self-biasing arrangement for the grids and thus eliminate the need for biasing batteries 78, 84, 89 and 95 of Figure 1.

In order to facilitate an understanding of the arrangement of Figure 2, identical reference numerals have been applied to those elements which correspond identically to elements of Figure 1. Furthermore, reference numerals one hundred higher have been applied to those elements which, while not identical to any elements in Figure 1, accomplish generally similar functions.

The arrangement of the motor field windings and the condenser 14 is identical to that of Figure 1 so that no description thereof is deemed necessary. In order to avoid unnecessary duplication of description, the gear train, the rudder, the gyroscope and the bridge have been omitted in Figure 2. It is to be understood, however, that motor 10 can be employed to operate such a rudder operator or any other similar device in the same manner as in Figure 1. While the primary 71 of transformer 70 is not shown as connected to any signal voltage, it is to be understood that this can be connected to a Wheatstone bridge such as shown in Figure 1 or to any other suitable source of alternating signal voltage which is reversible in phase. The tubes in this species are designated by the reference numerals 144 to 147 and are preferably vacuum tubes. A typical tube which is suitable for this purpose is the type 2A3. Tube 144 comprises a cathode 149, a control grid 150, and an anode 152. Associated with the cathode 149 is a cathode heater 154 connected to any suitable energizing source (not shown). Tube 145 similarly comprises a cathode 156, a control grid 157 and an anode 159. The tube 146 has a cathode 160, a grid 161 and an anode 163. The tube 147 comprises a cathode 165, a grid 166 and an anode 168. In each case, the cathode is provided with a cathode heater as in the case of tube 144.

Associated with the cathode 149 is a cathode biasing resistor 201 and a by-pass condenser 200.

Similarly, in connection with tube 145 is a cathode biasing resistor 202 and a by-pass condenser 203. Associated with tubes 146 and 147, respectively, are cathode biasing resistors 204 and 206 which are by-passed by condensers 205 and 207 respectively.

The transformer 135 comprises a primary winding 136 which may be connected to any suitable source of power and a secondary winding 137. The primary winding 136 must be connected to a source of power which is also associated with a means for supplying the signal voltage to primary 71 so that the voltage across primary 71 and that across primary 136 always has a phase relationship determined solely by the controlling effect. The upper terminal of secondary 72 is connected through a conductor 181, and the biasing resistor 201 to the cathode 149. The lower terminal of secondary 72 is connected through conductor 177 to the grid 150. The upper terminal of secondary 73 is connected through conductor 187 to the control grid 157. The lower terminal of secondary 73 is connected through conductor 186 and biasing resistor 202 to the cathode 156. The upper terminal of secondary 74 is connected through conductors 192 and 193 and biasing resistor 204 to the cathode 160. The lower terminal of secondary 74 is connected through conductor 191 to the grid 161. The upper terminal of secondary 75 is connected to control grid 166 through conductor 94 and the lower terminal is connected through conductor 198 and cathode biasing resistor 206 to the cathode 165. Thus, the voltages appearing across secondaries 72, 73, 74 and 75 upon the occurrence of a signal voltage are impressed between the grids and cathodes of tubes 144 to 147, respectively. In each case, the connections include the cathode biasing resistor associated with the cathode of the tube in question. This cathode biasing resistor functions in the usual manner to introduce a biasing voltage into the grid circuit by reason of the voltage drop occurring thereacross as a result of the anode current flowing through the tube. Thus, in the absence of any signal voltage, the current flowing through any tube circuit is very small due to the biasing effect of the biasing resistors.

Operation of Figure 2

Let it first be assumed that the phase of the signal voltage is such that during the half cycle in which the left-hand terminal of secondary 137 is positive with respect to the right-hand terminal, the polarities of the voltages across secondaries 72 to 75 correspond to the legends appearing on the drawings. Under these conditions, tube 147 is not conductive since the anode 168 is negative with respect to the cathode 165. Tube 146 is not conductive since the effect of the voltage across secondary 74 is to render the grid 161 further negative with respect to the cathode 160. Similarly, tube 145 is non-conductive since the anode 159 is negative with respect to the cathode. Tube 144 is conductive, however, since the anode 152 is positive with respect to cathode 149 and the effect of the voltage across secondary 72 is to raise the potential of grid 150 with respect to cathode 149. As a result, current flows to field winding 12 as follows: from the left-hand terminal of secondary 137 through conductor 210, motor field winding 12, conductors 211 and 212, anode 152, cathode 149, biasing resistor 201 and conductors 214, 215 and 216 back to the right-hand terminal of secondary 137. At the same time, a circuit is also established to motor field winding 13 as follows: from the left-hand terminal of secondary 137 through conductor 210, field winding 13, conductor 16, condenser 14, conductors 15, 211 and 212, anode 152, cathode 149, resistor 201 and conductors 214, 215 and 216 to the right-hand terminal of secondary 137.

During the next half cycle, all of the polarities are reversed. Under these conditions, tube 147 is non-conductive since the grid 166 is now negative with respect to cathode 165. Similarly, tube 146 is non-conductive since the anode 163 is negative with respect to cathode 160 and tube 144 is non-conductive since the anode 152 is now negative with respect to the cathode. Tube 145 is conductive, however, since the anode is now positive with respect to the cathode and since the effect of the voltage across secondary 73 is such as to tend to raise the voltage of grid 157 with respect to cathode 156. Thus, current flows to field winding 12 through the following circuit: from the right-hand terminal of secondary 137 through conductors 216, 215 and 218, anode 159, cathode 156, cathode resistor 202, conductor 211, field winding 12, and conductor 210 to the left-hand terminal of secondary 137. At the same time, a circuit is established to field winding 13 as follows: from the right-hand terminal of secondary 137 through conductors 216, 215 and 218, anode 159, cathode 156, biasing resistor 202, conductors 211 and 15, condenser 14, conductor 16, field winding 13, and conductor 210, to the left-hand terminal of secondary 137.

It will be seen from the above that with a signal voltage of the phase being considered, tubes 144 and 145 are conductive during all half cycles to supply alternating current directly to field winding 12 and through the condenser 14 to field winding 13. The current through field winding 13 thus leads that through field winding 12 and the motor rotates in one direction.

When the phase of the signal voltage is reversed, the polarities of the voltages across secondaries 72 to 75 will likewise be reversed. As a result, during the half cycle in which the voltage of secondary 137 is that indicated by the legends, the grid 150 will be negative with respect to the cathode 149 so that tube 144 will be non-conductive. During the same half cycle, the anode 159 is negative with respect to the cathode 156. In other words, the voltages impressed upon the grids 150 and 157 are now out of phase with the anode voltages impressed on the two tubes 144 and 145. Under these conditions, the anode 168 will be negative with respect to the cathode 165 so that tube 147 will not be conductive. Tube 146 will, however, be conductive since the anode will be positive with respect to the cathode and the effect of the voltage across secondary 74 tends to raise the potential of the grid with respect to the cathode. As a result, a circuit will be established to field winding 13 as follows: from the left-hand terminal of secondary 137 through conductor 210, field winding 13, conductors 218 and 219, anode 163, cathode 160, biasing resistor 204, and conductors 193, 220 and 216 to the other terminal of secondary 137. At the same time, an energizing circuit will be established to field winding 12 as follows: from the left-hand terminal of secondary 137 through conductor 210, field winding 12, conductor 15, condenser 14, conductors 16, 218 and 219, anode 163, cathode 160, biasing resistor 204, and conductors 193, 220 and 216 to the right-hand terminal of secondary 137.

During the next half cycle, the polarities of the voltages across secondaries 72 to 75 will be the same as indicated in the drawing, while the voltage across the secondary 137 will be opposite to that indicated by the legends. As a result, tubes 144 and 146 will be non-conductive by reason of the anodes being negative with respect to the cathodes. Tube 145 will be non-conductive because the voltage applied by secondary 73 will tend to drive grid 157 negative with respect to cathode 156. However, the tube 147 will be conductive since the anode is now positive with respect to the cathode and the voltage applied by secondary 75 tends to raise the potential of grid 166 with respect to cathode 165. As a result of tube 147 being conductive, a circuit will be established to field winding 13 as follows: from the right-hand terminal of secondary 137 through conductors 216, 220, 193 and 222, anode 168, cathode 165, biasing resistor 206, conductors 223 and 218, field winding 13 and conductor 210 to the left-hand terminal of secondary 137. At the same time, a circuit will be established to field winding 12 as follows: from the right-hand terminal of secondary 137 through conductors 216, 220, 193 and 222, anode 168, cathode 165, cathode resistor 206, conductors 223, 218 and 16, condenser 14, conductor 15, field winding 12 and conductor 210 to the left-hand terminal of secondary 137.

Thus again, both windings 12 and 13 are energized during opposite half cycles in opposite directions as a result of the alternative conductivity of tubes 146 and 147. In this case, field winding 13 is energized directly whereas field winding 12 is energized through condenser 14 so that the current through the latter leads that through the former, thus causing operation of motor 10 in the opposite direction.

It is to be noted that with the species of Figure 2, as with the species of Figure 1, a motor 10 is supplied with a full alternating current as distinguished from a half-wave rectified current such as is the common practice in connection with discriminator circuits. Furthermore, this is accomplished in the arrangement of Figure 2 with the use of a single secondary winding with no center tap, this secondary winding being connected in the anode circuit of all four tubes.

Conclusion

It will be seen that I have provided a new and improved motor controlling apparatus by which a reversible motor can be operated in one direction or another through the operation of a discriminator circuit, and in which the voltage supplied to the motor is at all times an alternating voltage with no appreciable direct current component.

While I have shown certain specific forms of my invention for purpose of illustration, it is to be understood that the scope of my invention is to be limited solely by the scope of the appended claims.

I claim as my invention:

1. In a motor control circuit, an alternating current power source, [a] *an alternating current* motor, a pair of electron tubes, each having an anode, a cathode, and a control element, *first circuit connections connecting* one terminal of said source [being connected] to the cathode of the first tube and to the anode of the second tube, *further circuit connections electrically connected to said motor and connecting* [and] the anode of the first tube and the cathode of the second tube [being connected to one terminal of said motor, the other terminal of said motor being connected] to the other terminal of said source, *means including a main controller for producing an alternating control voltage reversible in phase and variable in magnitude dependent upon the direction and magnitude of change of said main controller said control voltage being of the same frequency as said source,* and means arranged to supply *said control voltage in phase opposition* [a variable potential] to the control elements of [each of] said tubes [, of the same frequency as said source, and of opposite phase on the respective tubes] *so that when said control voltage is of one phase, said tubes are conductive on opposite half cycles to supply a full wave alternating current to said motor and when said control voltage is of the opposite phase, neither tube is conductive.*

2. In control apparatus for supplying alternating current to a load means in one manner or another, a source of alternating signal voltage, reversible in phase in accordance with the condition of a main controller, a source of alternating power, and means for supplying alternating current from said last named source to said load means in the one manner or the other depending upon the phase of said signal voltage, said means comprising two pairs of electronic discharge devices each having an anode, a cathode, and a control element, both pairs of devices being connected between said load means and said source of power, the anodes and cathodes of the discharge devices of each pair being reversibly connected together so as to be conductive during alternate half cycles, and means for applying voltages to the control elements of said discharge devices related to the signal voltage in such a manner that the devices of one or the other of said pairs of devices are energized during alternate half cycles, the pair which is energized depending upon the phase of said signal voltage, said last named means comprising a transformer having a primary winding and four secondary windings, said primary winding being connected to said source of signal voltage and said secondary windings each being connected between the cathode and control element of a different device.

3. In motor control apparatus, a reversible alternating current motor to be controlled and having two paths therethrough, said motor being operative in one direction or the other dependent upon which of said paths is energized, a source of alternating signal voltage reversible in phase in accordance with the condition of a main controller, a source of alternating power and means for selectively supplying power from said source to one or the other of said motor paths, said means including two pairs of electronic discharge devices each having an anode, a cathode, and a control element, each pair of devices being connected in series with one of said motor paths, the anodes and cathodes of the discharge devices of each pair being reversibly connected together so as to be conductive during alternate half cycles, and means for applying voltages to the control elements of said discharge devices related to the signal voltage in such a manner that one or the other of said pairs of discharge devices is energized depending upon the phase of said signal voltage.

4. In motor control apparatus, a reversible alternating current motor to be controlled and having two paths therethrough, said motor being operative in one direction or the other dependent upon which of said paths is energized, a source of alternating signal voltage reversible in phase in accordance with the condition of a main controller, a source of alternating power and means for selectively supplying power from said source to one or the other of said motor paths, said means including two pairs of electronic discharge devices each having an anode, a cathode, and a control element, each pair of devices being connected in series with one of said motor paths, the anodes and cathodes of the discharge devices of each pair being reversibly connected together so as to be conductive during alternate half cycles, and means for applying voltages to the control elements of said discharge devices, the voltages applied to the control elements of the devices of either pair being reverse in phase with respect to each other and with respect to those applied to the control elements of the devices of the other pair so that the devices of one pair or the other are energized during alternate half cycles, the pair that is energized depending upon the phase of said signal voltage.

5. In motor control apparatus, a reversible alternating current motor to be controlled and having two paths therethrough, said motor being operative in one direction or the other dependent upon which of said paths is energized, a source of alternating signal voltage reversible in phase in accordance with the condition of a main controller, a source of alternating power connected in series with both of said motor paths and means for selectively controlling the connections between said source and said two motor paths, said means including two pairs of electronic discharge devices each having an anode, a cathode, and a control element, each pair of devices being connected in series with one of said motor paths, the anodes and cathodes of the discharge devices of each pair being reversibly connected together so as to be conductive during alternate half cycles, and means for applying voltages to the control elements of said tubes related to the signal voltage in such a manner that one or the other of said pairs of tubes is energized depending upon the phase of said signal voltage.

6. In motor control apparatus, a reversible alternating current motor to be controlled and having two paths therethrough, said motor being operative in one direction or the other dependent upon which of said paths is energized, a source of alternating signal voltage reversible in phase in accordance with the condition of a main controller, a source of alternating power having two portions connected in phase opposition and each connected in series with one of said paths, and means for selectively controlling the connections between said two portions and said two motor paths, said means including two pairs of electronic discharge devices each having an anode, a cathode, and a control element, each pair of devices being connected in series with one of said motor paths, the anodes and cathodes of the discharge devices of each pair being reversibly connected together so as to be conductive during alternate half cycles, and means for applying voltages to the control elements of said tubes related to the signal voltage in such a manner that one or the other of said pairs of tubes is energized depending upon the phase of said signal voltage.

7. In control apparatus for supplying alternating current to a load means in either of two manners, a source of alternating signal voltage reversible in phase in accordance with the condition of a main controller, a source of alternating power, and means for supplying alternating current from said last named source to said load means selectively in one or the other of said two manners depending upon the phase of said signal voltage, said means comprising two pairs of electronic discharge devices each having an anode, a cathode, and a control element, both pairs of devices being connected between said load means and said source of power, the anodes of the discharge devices of each pair being oppositely connected to said source so as to be conductive during alternate half cycles and oppositely connected to said load means so that the current through said load means reverses during alternate half cycles, and means for applying voltages to the control elements of said discharge devices related to the signal voltage in such a manner that the devices of one or the other of said pairs of devices are energized during alternate half cycles, the pair which is energized depending upon the phase of said signal voltage.

8. For control of a motor having three terminals, and which runs in one direction when current is supplied to the first and second terminals, and in the other direction when current is supplied to the second and third terminals, a system including a source of alternating current power, a connection between one terminal of said source and said second terminal of the motor, a first and second electron tube, each having an anode, a cathode, and a control element, a connection between said source, the cathode of said first tube and the anode of the second tube, a connection between the first terminal of the motor, the anode of said first tube and the cathode of the second tube, a third and fourth electron tube, each having an anode, a cathode, and a control element, a connection between said source, the cathode of said third tube and the anode of the fourth tube, a connection between the third terminal of the motor, the anode of the third tube and the cathode of the fourth tube, means arranged to supply a variable control voltage between the control element and cathode of each of the first and second tubes, of the same frequency as said source and of opposite phase on the respective tubes, and means arranged to supply a variable control voltage between the control element and cathode of each of the third and fourth tubes, of the same frequency as said source and of opposite phase on the respective tubes.

9. For control of a motor having a pair of windings relatively displaced in space phase, having a common terminal, and each having a free terminal, a system including a center-tapped alternating current power supply, a connection between the center tap of said power supply and the common terminal of said motor windings, a connection from one terminal of the power supply to the free terminal of one motor winding, an electron tube having anode and cathode elements interposed in series with the last mentioned connection, means rendering said electron tube conductive upon the application to said means of an alternating control voltage exceeding a predetermined magnitude and having a given phase polarity with respect to that of the power supply, a connection from the other terminal of the power supply to the free terminal of the other motor winding, a second electron tube, having anode and cathode elements interposed in series with the last mentioned connection means rendering said electron tube conductive upon the application to said means of an alternating control voltage exceeding a predetermined magnitude and having a phase polarity with respect to that of the power supply which is the opposite of that for the first mentioned control voltage, and a phase shifting device connected between the free terminals of the motor windings.

10. In control apparatus for supplying alternating current to a load means in one manner or another, a source of alternating signal voltage reversible in phase in accordance with the condition of a main controller, a source of alternating power, and means for supplying alternating current with substantialy no unidirectional component from said last named source to said load means in the one manner or the other depending upon the phase of the signal voltage, said means comprising two pairs of electronic discharge devices each having an anode, a cathode, and a control element, each pair of devices being so connected between said load means and said source of power in series with said source of power that when the devices of the pair are conductive current flows through said load means in opposite directions during alternate half cycles, and means for applying alternating voltages to the control elements of said discharge devices related to the signal voltage in such a manner that the devices of one or the other of said pairs of devices are energized during alternate half cycles, the pair which is energized depending upon the phase of said signal voltage with respect to said source of power.

11. In control apparatus for supplying alternating current to either one or the other of two portions of a load means, a source of alternating signal voltage reversible in phase in accordance with the condition of a main controller, a source of alternating power, and means for supplying alternating current with no appreciable unidirectional component from said last named source to one or the other of said two portions of said load means depending upon the phase of the signal voltage, said means comprising two pairs of electronic discharge devices each having an anode, a cathode, and a control element, each pair of devices being so connected between said source of power in series with said source of power and one of said two portions of said load means that when the devices of the pair are conductive current flows through the associated portion of the load means in opposite directions during alternate half cycles, and means for applying alternating voltages to the control elements of said discharge devices related to the signal voltage in such a manner that the devices of one or the other of said pairs of devices are energized during alternate half cycles, the pair which is energized depending upon the phase of said signal voltage with respect to said source of power.

12. In a motor control circuit, an alternating current power source, [a] *an alternating current* motor, a pair of gas filled tubes, each having an anode, a cathode, and a control element, *first circuit connections connecting* one terminal of said source [being connected] to the cathode of the first tube and to the anode of the second tube, *further circuit connections electrically connected to said motor and connecting* the anode of the first tube and the cathode of the second tube [being connected to one terminal of said motor, the other terminal of said motor being connected] to the other terminal of said source, *means including a main controller for producing an alternating control voltage reversible in phase and variable in magnitude dependent upon the direction and magnitude of change of said main controller, said controller being of the same frequency as said source,* and means arranged to supply *said control voltage in phase opposition* [a variable potential] to the control elements of [each of] said tubes [, of the same frequency as said source, and of opposite phase on the respective tubes] *so that when said control voltage is of one phase, said tubes are conductive on opposite half cycles to supply a full wave alternating current to said motor and when said control voltage is of the opposite phase, neither tube is conductive.*

WILLIAM J. FIELD.

REFERENCES CITED

The following references are of record in the file of this patent or the original patent:

UNITED STATES PATENTS

| Number | Name | Date |
|---|---|---|
| 1,955,322 | Brown | Apr. 17, 1934 |
| 2,154,375 | Chambers | Apr. 11, 1939 |
| 2,223,666 | Harrison | Dec. 3, 1940 |
| 2,423,228 | Conklin | July 1, 1947 |
| 2,425,605 | Edwards | Aug. 12, 1947 |